US009272334B2

(12) United States Patent
Carpenter

(10) Patent No.: US 9,272,334 B2
(45) Date of Patent: Mar. 1, 2016

(54) SYNTHESIS OF PLATINUM-ALLOY NANOPARTICLES AND SUPPORTED CATALYSTS INCLUDING THE SAME

(71) Applicant: GM Global Technology Operations LLC, Detroit, MI (US)

(72) Inventor: Michael K. Carpenter, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 738 days.

(21) Appl. No.: 13/653,688

(22) Filed: Oct. 17, 2012

(65) Prior Publication Data

US 2013/0053239 A1  Feb. 28, 2013

Related U.S. Application Data

(63) Continuation-in-part of application No. 13/084,826, filed on Apr. 12, 2011, now abandoned.

(60) Provisional application No. 61/658,170, filed on Jun. 11, 2012.

(51) Int. Cl.
| | |
|---|---|
| *B22F 9/24* | (2006.01) |
| *H01M 4/92* | (2006.01) |
| *B82Y 40/00* | (2011.01) |
| *B22F 1/00* | (2006.01) |
| *C22C 1/04* | (2006.01) |

(52) U.S. Cl.
CPC ............... *B22F 9/24* (2013.01); *H01M 4/921* (2013.01); *H01M 4/925* (2013.01); *B22F 1/0018* (2013.01); *B82Y 40/00* (2013.01); *C22C 1/0466* (2013.01); *Y02E 60/50* (2013.01)

(58) Field of Classification Search
CPC ............ C22C 19/03; C22C 5/04; C22C 1/00; B01J 23/42; B01J 23/755; B01J 23/892; B01J 37/00; B01J 37/16
USPC .......... 502/167, 326, 337, 339; 420/456, 468, 420/590
See application file for complete search history.

(56) References Cited

U.S. PATENT DOCUMENTS

| | | | | |
|---|---|---|---|---|
| 4,954,474 | A * | 9/1990 | Tsurumi et al. ................ | 502/185 |
| 7,407,527 | B2 | 8/2008 | Hyeon | |
| 7,569,508 | B2 * | 8/2009 | Zhou et al. .................... | 502/150 |
| 7,659,224 | B2 * | 2/2010 | Shimazaki et al. ............ | 502/180 |
| 7,670,713 | B2 * | 3/2010 | Kwak et al. ................... | 429/532 |
| 8,962,513 | B2 * | 2/2015 | Liu et al. ....................... | 502/185 |
| 2004/0247503 | A1 * | 12/2004 | Hyeon ............................ | 423/1 |
| 2006/0159603 | A1 * | 7/2006 | Vanheusden et al. .......... | 423/1 |
| 2008/0032047 | A1 * | 2/2008 | Parashar et al. ............ | 427/372.2 |
| 2008/0070777 | A1 * | 3/2008 | Jang et al. ..................... | 502/101 |
| 2008/0096093 | A1 | 4/2008 | Jang et al. | |
| 2010/0120942 | A1 | 5/2010 | Ajayan et al. | |
| 2011/0177938 | A1 * | 7/2011 | Scheab et al. ................ | 502/185 |
| 2011/0207019 | A1 * | 8/2011 | Mukerjee ...................... | 429/487 |
| 2012/0264598 | A1 * | 10/2012 | Carpenter et al. ............ | 502/326 |

OTHER PUBLICATIONS

Non-Final Office Action dated Aug. 8, 2013 pertaining to U.S. Appl. No. 13/084,826, filed Apr. 12, 2011.
Wu et al., "Truncated Octahedral Pt3Ni Oxygen Reduction Reaction Electrocatalysts", Am. Chem. Soc., 2010, vol. 132, No. 14, pp. 4984-4985 and S1-S8.
Gyoung Haw Jeong; Minjung Kim, Young Wook Lee, Wonjun Choi, Won Taek Oh, Q-Han Park, Sang Woo Han; Polyhedral Au Nanocrystals Exclusively Bound by {110} Facets: The Rohmbic Dedecahedron; JACS Communications; J. Am. Chem. Soc. 2009, vol. 131, No. 5, 2009; pp. 1672-1672; Published on Web Jan. 14, 2009.
Isabel Pastoriza-Santos and Luis M. Liz-Marzan; Formation and Stabilization of Silver Nanoparticles through Reduction by N, N-Dimethylformamide; 1999 American Chemical Society; Langmuir, vol. 15; pp. 948-951; Published on Web Jan. 15, 1999.
Isabel Pastoriza-Santos; Luis M. Liz-Marzan; Synthesis of Silver Nano-prisms in DMF; 2002 American Chemical Society; Nano Letters 2002 vol. 2, No. 8; pp. 903-905; Published on Web Jul. 19, 2002.
Vojislav R. Stamenkovic, Ben Fowler, Bongjin Simon Mun, Guofeng Wang, Philip N. Ross, Christopher A. Lucas, Nenad M. Markovic; Improved Oxygen Reduction Activity on Pt3Ni(111) via Increased Surface Site Availability; Science by American Association for the Advancement of Science; Jan. 26, 2007; vol. 315; pp. 493-497.
Jianbo Wu, Junliang Zhang, Zhenmeng Peng, Shengchun Yang, Frederick T. Wagner, and Hong Yang; Truncated Octahedral Pt3Ni Oxygen Reduction Reaction Electrocatalysts; JACS Communications; 2010 American Chemical Society; vol. 132, No. 14; pp. 4984-4985; Published on Web Mar. 24, 2010.
Jun Zhang, Hongzhou Yang, Jiye Fang, Shouzhong Zou; Synthesis and Oxygen Reduction Activity of Shape-Controlled Pt3Ni Nanopolyhedra; 2010 American Chemical Society; Nano Letters 2010; Published on Web Jan. 15, 2010.
Hubert A. Gasteiger, Daniel R. Baker, Robert N. Carter, Wenbin Gu, Yuxin Liu, Frederick T. Wagner, and Paul T. Yu; Electrocatalysis and Catalyst Degradation Challenges in Proton Exchange Membrane Fuel Cells; Hydrogen Energy edited by Detlef Stolten; Copyright 2010 Wiley-VCH Verlag GmbH & Co. KGaA, Weinheim.

(Continued)

*Primary Examiner* — Patricia L Hailey
(74) *Attorney, Agent, or Firm* — Dinsmore & Shohl LLP

(57) ABSTRACT

Methods of synthesizing platinum-nickel-alloy nanoparticles and supported catalysts comprising the nanoparticles are provided. The methods may comprise forming a reaction mixture in a reaction vessel; heating the reaction mixture sealed in the reaction vessel to a reaction temperature; maintaining the temperature of the reaction vessel for a period of time; cooling the reaction vessel; and removing platinum-alloy nanoparticles from the reaction vessel. The reaction mixture may comprise a platinum precursor, a nickel precursor, a formamide reducing solvent, and optionally a cobalt precursor. In some embodiments the reaction temperature is at or below the boiling point of the formamide reducing solvent, such as from about 120° C. to about 150° C., for example. The platinum-alloy nanoparticles provide favorable electrocatalytic activity when supported on a catalyst support material.

20 Claims, No Drawings

(56) References Cited

OTHER PUBLICATIONS

Chun-Hua Cui, Lin Gan, Hui-Hui Li, Shu-Hong Yu, and Peter Strasser; Octahedral PtNi Nanoparticles: Exceptional Oxygen Reduction Activity by Tuning Surface Alloy Composition; Shape Selective Electrocatalysis; Nano Letters 2012; Copyright 2012 American Chemical Society, pp. 1-8, Published on Web Oct. 12, 2012.

Michael K. Carpenter, Thomas E. Moylan, Ratandeep Singh Kukreja, Mohammed H. Atway, and Misle M. Tessema; Solvothermal Synthesis of Platinum Alloy Nanoparticles for Oxygen Reduction Electrocatalysis; American Chemical Society, 2012; pp. 1-9, Published on Web Apr. 23, 2012.

* cited by examiner

SYNTHESIS OF PLATINUM-ALLOY NANOPARTICLES AND SUPPORTED CATALYSTS INCLUDING THE SAME

CROSS-REFERENCES TO RELATED APPLICATIONS

This application is a continuation-in-part of U.S. patent application Ser. No. 13/084,826, filed Apr. 12, 2011. This application further claims the benefit of priority under 35. U.S.C. §119(e) to U.S. Prov. App. Ser. No. 61/658,170, filed Jun. 11, 2012, which application is incorporated herein by reference in its entirety.

TECHNICAL FIELD

Embodiments disclosed herein relate to platinum-alloy catalysts and, more particularly, to methods for synthesizing platinum-alloy nanoparticles and to supported catalysts comprising the platinum-alloy nanoparticles synthesized according to the methods.

BACKGROUND

The noble metal platinum commonly is used in fuel-cell cathodes as an electrocatalyst for the oxygen-reduction reaction (ORR). However, the need for large amounts of costly platinum remains an economic hindrance in the development of fuel cells for large-scale implementations such as in automobiles, for example. Fuel-cell catalysts typically comprise nanoparticles of platinum or of catalytically active platinum alloys. The nanoparticles may be supported on a material such as carbon.

To reduce the amount of platinum required in fuel cells, catalysts may be developed to have higher platinum mass activities. The platinum mass activity is a function of electrocatalytic activity per mass amount of platinum, irrespective of the presence of other metals in the catalyst. As such, in comparing a pure-platinum catalyst (100% platinum) and a platinum-alloy catalyst (less than 100% platinum) having all other physical and catalytic properties identical and being loaded to the same amount onto a catalyst support, the platinum-alloy catalyst may have a higher platinum mass activity than that of the pure-platinum catalyst. In this regard, binary and ternary platinum-nickel alloys and platinum-cobalt alloys are of particular interest.

Increased platinum mass activity of a given platinum-alloy nanoparticle catalyst can be attained, for example, through control of the composition, shape, and particle size of the nanoparticles used for the catalyst. With particular regard to shape, it has been recognized that catalytic activity of certain platinum alloys may be enhanced when the catalytic surface has a (111)-orientation, as opposed to a (100)-orientation. However, common synthetic methods for platinum-alloy nanoparticles typically lead to spherical nanoparticles. Attempts at preparing platinum-alloy nanoparticles with (111)-faceted surfaces have involved high reaction temperatures (above 500° C.), undesirable reagents such as toxic solvents or reagents, and/or very powerful reducing agents, and/or time-consuming and expensive plasma surface-treatments to clean the particle surfaces. Ongoing needs exist for efficient methods to produce platinum-alloy nanoparticles with increasing catalytic activity.

SUMMARY

Against the above background, embodiments described herein are directed to methods for synthesizing platinum-alloy nanoparticles with controlled compositions, shapes, and sizes amenable to use of the platinum-alloy nanoparticles as ORR electrocatalysts. The platinum-alloy nanoparticles may have increased mass activity over pure platinum and, thereby, may decrease the amount of platinum required to prepare supported fuel-cell catalysts.

Illustrative embodiments herein are directed to methods of synthesizing platinum-alloy nanoparticles. The methods may comprise forming a reaction mixture in a reaction vessel; sealing the reaction vessel; heating the reaction mixture sealed in the reaction vessel to a reaction temperature; maintaining the temperature of the reaction vessel for a period of time; cooling the reaction vessel; and removing platinum-alloy nanoparticles from the reaction vessel. The reaction mixture may comprise a platinum precursor; a second precursor selected from the group consisting of a nickel precursor, a cobalt precursor, and mixtures thereof; a formamide reducing solvent; and, optionally, a capping agent.

Still further embodiments are directed to methods for forming supported catalysts comprising $Pt_3(Ni,Co)$ nanoparticles having (111)-oriented faces or facets. An example method of forming a supported catalyst comprising $Pt_3(Ni,Co)$ nanoparticles having (111)-oriented faces or facets may comprise forming a reaction mixture in a reaction vessel; sealing the reaction vessel; heating the reaction mixture sealed in the reaction vessel to a reaction temperature; maintaining the temperature of the reaction vessel for period of time to form in the reaction mixture $Pt_3(Ni,Co)$ nanoparticles having (111)-oriented faces or facets; and cooling the reaction vessel. Then, a supported catalyst may be formed by dispersing the $Pt_3(Ni,Co)$ nanoparticles in a dispersing solvent to form a dispersion mixture; adding a catalyst support material to the dispersion mixture; agitating the dispersion mixture to cause the $Pt_3(Ni,Co)$ nanoparticles to load onto the catalyst support material so as to form the supported catalyst; and filtering the supported catalyst from the dispersion mixture.

Still further embodiments are directed to methods for synthesizing platinum-nickel-alloy nanoparticles by a low-temperature process. The methods may include forming a reaction mixture in a reaction vessel. The reaction mixture may contain a platinum precursor, a nickel precursor, and a formamide reducing solvent. The reaction mixture may be heated in the reaction vessel to a reaction temperature of at least 120° C. or, in preferred embodiments from about 120° C. to the boiling point of the formamide reducing solvent. The temperature of the reaction vessel may be maintained for at least 1 hour, such as for about 6 hours or about 24 hours, or even longer than 24 hours. The reaction vessel then may be cooled, and the platinum-nickel alloy nanoparticles may be removed from the reaction vessel. In preferred embodiments, the reaction mixture in the reaction vessel may be stirred while the reaction temperature is maintained. The reaction vessel may be sealed or unsealed while the reaction temperature is maintained.

Further embodiments are directed to supported catalysts comprising platinum-alloy nanoparticles synthesized according to one or more of the above embodiments and supported on a catalyst support material.

These and other features, aspects, and advantages of the embodiments will become better understood with reference to the following detailed description and the appended claims.

DETAILED DESCRIPTION

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

As used herein, the term "spherical nanoparticle" refers to a nanoparticle that does not possess any facets or faces with a single crystalline orientation. As such, the term "spherical" may encompass not only perfect spheres, but also ellipsoidal nanoparticles and oblong nanoparticles having essentially rounded surfaces.

The term "cubic nanoparticle" refers to a nanoparticle having eight corners and six faces, each face having a (100) orientation. As such, the term "cubic" may further encompass shapes such as rectangular prisms. The term "truncated cubic nanoparticle" refers to a nanoparticle having six octagonal (100)-oriented faces and eight triangular (111) faces, the (111) faces replacing each of the eight vertices of a cubic nanoparticle.

The term "octahedral nanoparticle" refers to a nanoparticle having six vertices and eight faces, each face having a (111) orientation. The term "truncated octahedral nanoparticle" refers to a nanoparticle having six square (100) faces and eight hexagonal (111) faces, the (100) faces replacing each of the six corners of an octahedral nanoparticle. The term "cuboctahedral nanoparticle" refers to a nanoparticle having six square (100) faces and eight equilateral triangular (111) faces. The ratio of the total surface area of the (111) faces to the total surface area of the (100) faces increases from the truncated cube to the cuboctahedron to the truncated octahedron.

As used herein, the term "hydrocarbyl" refers to a monovalent radical formed by removing any one hydrogen from a hydrocarbon molecule, where a "hydrocarbon molecule" is any molecule consisting of hydrogen atoms and carbon atoms. Except where defined otherwise, the term "hydrocarbyl" encompasses linear groups, branched groups, cyclic groups, and combinations thereof, wherein any two neighboring carbon atoms may be joined by a single bond, a double bond, or a triple bond. As used herein, the term "$C_x$ to $C_y$ hydrocarbyl," where x and y are integers, refers to a hydrocarbyl having from x to y total carbon atoms and a sufficient number of hydrogen atoms to maintain the monovalency of the hydrocarbyl.

As used herein, the term "platinum-alloy nanoparticles" refers to nanoparticles that comprise a platinum alloy, namely, an alloy of platinum and at least one other metal.

As used herein, the term "$Pt_3$(Ni,Co) nanoparticles" refers to nanoparticles within the full compositional range $Pt_3Ni_xCo_{1-x}$, where x is from 0 to 1. As such, $Pt_3$(Ni,Co) may describe all of the following: (a) an alloy consisting of or consisting essentially of platinum and nickel; (b) an alloy consisting of or consisting essentially of platinum and cobalt; and (c) an alloy consisting of or consisting essentially of platinum, nickel, and cobalt. In all such alloys, the molar ratio of the platinum to the sum of all other metals is "approximately 3:1," as defined below in greater detail. As used here, the term "consisting essentially of" with regard to the $Pt_3$(Ni,Co) alloys means that one or more minor, unintentional impurities may be present in the alloy forming any particular nanoparticle, typically at a total level of less than 1% by weight, more typically at a total level of less than 0.1% by weight, desirably at a total level of less than 0.01% by weight, based on the weight of the alloy forming the particular nanoparticle.

Some embodiments herein are directed to methods for synthesizing platinum-alloy nanoparticles having controlled sizes and shapes. The methods are characterized by relatively low process temperatures, avoidance of use of various highly toxic reagents and strong reducing agents, and the ability to perform the synthesis outside of a controlled atmosphere, obviating the need for a glove box or a Schlenk line. In preferred embodiments, the synthetic methods lead to formation of platinum-alloy nanoparticles, such as $Pt_3$(Ni,Co) nanoparticles, $Pt_3$Ni nanoparticles, or $Pt_3$Co nanoparticles, that have a plurality of (111)-oriented faces or facets believed to impart an increased catalytic activity to the material. The nanoparticles having a plurality of (111)-oriented faces or facets may include, for example, nanoparticles that are truncated cubes, cuboctahedra, truncated octahedra, or octahedra.

In some embodiments, a method of synthesizing platinum-alloy nanoparticles may include first forming a reaction mixture in a reaction vessel. The reaction mixture comprises (a) a platinum precursor; (b) a second precursor selected from the group consisting of a nickel precursor and a cobalt precursor; (c) a formamide reducing solvent; and (d) an optional capping agent. Preferably, the reaction mixture may be air-stable, non-pyrophoric, and non-hygroscopic or minimally hygroscopic. As such, an air-stable reaction mixture is particularly amenable to a bench-top synthesis not requiring cumbersome and costly maintenance of a controlled inert atmosphere.

The reaction vessel may be any suitable vessel that can be sealed and that, once sealed, can withstand internal pressures created by heating the reaction mixture inside the reaction vessel to a reaction temperature of up to 250° C. Preferably, the reaction vessel is made from a material chemically inert to all components of the reaction mixture. Examples of a suitable reaction vessel include a sealable PTFE or Teflon® vessel. Specific, non-limiting examples of a suitable reaction vessel include acid digestion vessels ('bombs'), available from Parr Instrument Company, which comprise a capped PTFE canister that fits snugly in a stainless-steel outer shell that is sealable with a threaded end cap.

The platinum precursor may be selected from any metallo-organic or platinum salt complexes that can be reduced by the formamide solvent at elevated temperatures. Examples of suitable platinum precursors include, but are not limited to, platinum(II) acetylacetonate, diammineplatinum(IV) hexachloride, diammineplatinum(II) nitrite, dimethyl(1,5-cyclooctadiene)platinum(II), potassium tetrachloroplatinate (II), dihydrogen hexachloroplatinate(IV) hydrate, tetraammineplatinum(II) nitrate, and cis-dichlorobis (triphenylphospine)platinum(II), and chemically compatible mixtures of any of these. Of these example platinum precursors, platinum(II) acetylacetonate is especially preferred for its ease of handling.

The second precursor may comprise or consist of a nickel precursor selected from nickel salts and metallo-organic nickel complexes that are reduced by the formamide solvent used. Examples of suitable nickel precursors include, but are not limited to, nickel(II) acetylacetonate, nickel(II) acetate, nickel(II) 2-ethylhexanoate, nickel(II) nitrate, nickel(II) sulfate, and hexaamminenickel(II) iodide. Salts such as nickel (II) acetate, and nickel(II) nitrate may be hydrated nickel salts or may be pre-treated to remove all waters of hydration. Of these example nickel precursors, nickel(II) acetylacetonate is preferred.

The second precursor may comprise or consist of a cobalt precursor selected from cobalt salts and metallo-organic cobalt complexes that are reduced by the formamide solvent used. Examples of suitable cobalt precursors include, but are not limited to, cobalt(II) acetylacetonate, cobalt(III) acetylacetonate, cobalt(II) acetate, cobalt(II) 2-ethylhexanoate, cobalt (II) nitrate, cobalt(II) sulfate, hexaamminecobalt(III) iodide, and cobalt(II) stearate. Of these example cobalt precursors, cobalt(II) acetylacetonate and cobalt(III) acetylacetonate are preferred.

When the reaction mixture comprises as metallo-organic precursors only a platinum precursor and a nickel precursor, the nanoparticles that result from the method will be binary alloys of platinum and nickel. When the reaction mixture comprises as metallo-organic precursors only a platinum precursor and a cobalt precursor, the nanoparticles that result from the method will be binary alloys of platinum and cobalt. A reaction mixture comprising a platinum precursor, a nickel precursor, and a cobalt precursor may form ternary alloys of platinum, nickel, and cobalt. But, if desired, at least one additional precursor may be added to the reaction mixture to form by the method a ternary, quaternary, or higher alloy comprising platinum, nickel, and/or cobalt. For example, in addition to the platinum precursor and the second precursor, at least one of a palladium precursor, an iridium precursor, or a gold precursor may be added to the reaction mixture to form nanoparticles such as PtPdM, PtIrM, PtAuM, PtPdIrM, PtPdAuM, PtIrAuM, or even PtPdIrAuM, where M is Ni, Co, or a combination of Ni and Co, of any desired stoichiometry. In this regard, suitable palladium precursors may include, without limitation, palladium(II) acetate, palladium(II) acetylacetonate, palladium(II) nitrate, palladium oxalate, potassium tetrachloropalladate(II), and tetraamminepalladium(II) nitrate. Suitable iridium precursors may include, without limitation, iridium(II) acetylacetonate and iridium(III) chloride. Suitable gold precursors may include, without limitation, gold(III) acetate, gold(III) chloride, hydrogen tetrachloroaurate(III) hydrate, and chlorotriphenylphosphine gold(I).

The formamide reducing solvent is formamide or a derivative thereof. Formamides are polar, aprotic solvents that are miscible with both water and many organic solvents. Furthermore, formamides can dissolve a number of metal salts and compounds, as well as many organic compounds that can act as adsorbates. Without intent to be bound by theory, it is believed that the formamide reducing solvent may function in the reaction mixture both as a solvent for the various metal precursors (Pt, Ni and/or Co) and as a reducing agent that facilitates reduction of the complexed metal ions in those precursors to yield platinum alloy particles. Thus, when the reaction mixture is heated, the formamide reducing solvent may act as a reductant for dissolved metal species to produce platinum-alloy nanoparticles having a uniform size, and, preferably, a plurality of (111)-oriented faces or facets.

Preferably, the formamide reducing solvent is a formamide derivative having the formula $R^1R^2N-C(=O)H$, where $R^1$ and $R^2$ each are bonded to the nitrogen atom and are independently selected from hydrogen and a $C_1$-$C_6$ hydrocarbyl. Preferably, both $R^1$ and $R^2$ are independently selected from a $C_1$-$C_6$ hydrocarbyl. The $C_1$-$C_6$ groups represented by $R^1$ and $R^2$ may be linear, branched, cyclic, or $C_6$ aromatic. Especially preferred $C_1$-$C_6$ hydrocarbyl groups are $C_1$-$C_3$ hydrocarbyl groups such as methyl, ethyl, n-propyl, and 1-methylethyl (isopropyl). Groups $R^1$ and $R^2$ may be the same or different, but preferably groups $R^1$ and $R^2$ are the same. In an example embodiment, the formamide reducing solvent may be selected from the group consisting of formamide, N-methylformamide, N-ethylformamide, N,N-dimethylformamide, N,N-diethylformamide, and mixtures thereof. In a preferred example embodiment, the formamide reducing solvent may be selected from the group consisting of N,N-dimethylformamide and N,N-diethylformamide, and mixtures thereof. In a more preferred example embodiment, the formamide reducing solvent is N,N-dimethylformamide. The formamide reducing solvents themselves have favorable toxicities, are easy to handle compared with stronger available reducing agents, and also are air-stable components to the reaction mixture.

The reaction mixture may further comprise an optional capping agent. The capping agent may be selected from the group consisting of cetyltrimethylammonium bromide; cetyltriethylammonium bromide; oleylamine; primary amines such as n-propyl amine, butyl amine, decyl amine, and dodecyl amine; pyridine; pyrrole; diethanolamine; triethanolamine; polyvinyl alcohol; adamantanecarboxylic acid; eicosanoic acid; oleic acid; tartaric acid; citric acid; heptanoic acid; polyethylene glycol; polyvinylpyrrolidone; tetrahydrothiophene; salts of any of these capping agents (for example, sodium citrate or potassium oleate); and combinations of two or more of the capping agents. Though the capping agent need not be included in the reaction mixture, in some embodiments the capping agent is present in the reaction mixture. Without intent to be bound by theory, it is believed that the presence of a capping agent in the reaction mixture may stabilize platinum-(nickel, cobalt)-alloy nanoparticles as they form and may favor the formation of non-spherical nanoparticles, particularly of nanoparticles having (111)-oriented faces or facets. The (111)-oriented faces or facets are particularly desirable when $Pt_3Ni$ nanoparticles or $Pt_3Co$ nanoparticles are formed, owing to the substantially higher electrocatalytic activity of (111)-oriented faces compared to that of (100)-oriented faces.

The reaction mixture may be formed in the reaction vessel by any suitable means, such as by sequentially adding the platinum precursor, the nickel precursor, the formamide reducing solvent, and the optional capping agent to the reaction vessel in any desired order. In preferred embodiments, the reaction mixture is air-stable and, therefore, the forming of the reaction mixture may be accomplished with the ingredients being exposed to air. Thus, advantageously, the forming of the reaction mixture need not occur in a controlled atmosphere such as in a glove box or on a Schlenk line. Even so, it will be understood that such controlled atmospheres may be used if desired such as, for example, by forming the reaction mixture in a glove box filled with an inert gas such as nitrogen or argon and then proceeding to seal the reaction vessel while it remains in the glove box.

In some embodiments, the methods herein may include sealing the reaction vessel. The reaction vessel may be sealed by any practical method. For example, if the reaction vessel itself comprises a lid having threads corresponding to threads on a body of the reaction vessel, the sealing may comprise simply rotating the lid to form a seal. Alternatively, the reaction vessel may be sealed with an appropriate cover held to the reaction vessel by means of a clamp or the like. In any regard, the sealing of the reaction vessel results in a sealed reaction vessel that remains sealed even when the reaction mixture inside the reaction vessel is heated to a reaction temperature such as 200° C., for example, resulting in a high internal pressure within the reaction vessel. In other embodiments, the reaction vessel may be left unsealed. Without intent to be bound by theory, it is believed that sealing the reaction vessel may be preferable, because sealing the reaction vessel may trap carbon monoxide, itself a reducing agent, in the reaction vessel.

The methods herein may further include heating the reaction mixture in the reaction vessel to a reaction temperature. The reaction temperature may be chosen based on the known boiling point of the formamide reducing solvent. In some embodiments, the reaction temperature may be at or above the boiling point of the formamide reducing solvent. Thus, in example embodiments, the reaction temperature may be greater than 150° C., greater than 160° C., greater than 170° C., greater than 180° C., greater than 190° C., greater than 200° C., or even greater than 250° C. Typically, the reaction temperature does not exceed 400° C., and preferably does not exceed 300° C., the reaction temperature being limited primarily to the ability of the chosen reaction vessel to retain structural integrity at the high temperature and resulting high internal pressure. In especially preferred embodiments, the reaction temperature is from about 150° C. to about 220° C. or from about 175° C. to about 210° C. In a preferred example embodiment, when the formamide reducing solvent is N,N-dimethylformamide, the reaction temperature preferably may be from 153° C. to about 205° C.

In other embodiments, however, the reaction temperature may be below the boiling point of the formamide reducing solvent such as from 120° C. to about 150° C., or from about 120° C. to about 145° C., or from about 130° C. to about 145° C., or from about 130° C. to about 140° C., for example. The lower reaction temperature may be particularly desirable when the molar ratio of platinum to nickel in the reaction mixture is about 1:1 or from about 0.5:1 to about 1.5:1.

The heating of the reaction mixture may follow a fast or a slow temperature profile, but preferably the heating from room temperature to reaction temperature occurs as quickly as practical. For example, the heating of the reaction mixture may be accomplished at a rate as low as 0.1° C./min, as quick as 50° C./min, or any rate between 0.1° C./min and 50° C./min. Preferably, the reaction mixture is heated at a rate of at least 10° C./min, more preferably at least 15° C./min, still more preferably from about 15° C./min to about 30° C./min, from about 15° C./min to about 25° C./min, or from about 25° C./min to about 40° C./min.

The methods herein may further include maintaining the temperature of the reaction vessel for a period of time. The temperature of the reaction vessel is maintained by any practical means, whereby during the period of time in which the temperature is maintained the temperature remains at or above the reaction temperature. The period of time during which the temperature is maintained need not necessarily be a continuous period of time. As such, it will be understood that maintaining the temperature may comprise lowering the temperature of the reaction vessel to below the reaction temperature for some period of time, then subsequently raising the temperature again to or above the reaction temperature. The reaction temperature should be maintained for at least 1 hour, preferably from about 1 hour to about 24 hours, or for any length of time within the range of 1 hour to 24 hours, such as for 90 minutes or for 13 hours and 10 minutes. In example embodiments, the reaction temperature is maintained for about 2 hours, about 4 hours, about 6 hours, about 10 hours, about 15 hours, or about 24 hours. It will be understood that the reaction temperature may be maintained for a substantially longer period of time such as, for example, 48 hours, 72 hours, or even 240 hours, if desired.

The methods herein may further include cooling the reaction vessel. The cooling may occur slowly, such as by controlling the cooling rate or by simply removing the heating source, or rapidly, such as by quenching the reaction vessel in a cold liquid. The cooling of the reaction vessel, in turn, lowers the internal pressure of the reaction vessel and renders the reaction vessel safe to be opened.

The methods herein may further include removing platinum-alloy nanoparticles from the reaction vessel. The reaction vessel first may be unsealed and opened, whereupon the platinum-alloy nanoparticles will be present in some quantity of remaining liquid. The remaining liquid may be poured from the reaction vessel and filtered by any practical means or the suspended nanoparticles can be centrifuged and collected. Optionally, the platinum-alloy nanoparticles may be cleaned by adding the remaining liquid from the reaction vessel into a solvent such as ethanol, for example, then stirring or sonicating the resulting mixture and subsequently filtering and collecting the nanoparticles. Also optionally, the platinum-alloy nanoparticles may be heated in air or inert gas to a temperature, for example, above 185° C., for a period of time to oxidize and remove any organic adsorbates from the surfaces of the platinum-alloy nanoparticles. Oxidative removal of organic adsorbates in this manner may improve specific activity and/or mass activity of the platinum-alloy nanoparticles.

Platinum-alloy nanoparticles synthesized according to the above-described methods may have sizes and shapes controlled by the reaction conditions; including the temperature profile, and the choice and concentrations of the platinum precursor, the second precursor, the formamide reducing solvent, and the optional capping agent. The platinum-alloy nanoparticles typically have mean particle sizes from about 3 nm to about 15 nm, depending on reaction conditions, and typically have narrow particle-size distributions as derived from a single reaction mixture.

Further embodiments are directed to supported catalysts prepared from platinum-alloy nanoparticles synthesized according to one or more embodiments of the above-described methods. The supported catalyst may comprise a catalyst support having the platinum-alloy nanoparticles dispersed on the outer surfaces of the catalyst support. The catalyst support may be any catalyst support material known in the art such as, for example, a high surface-area carbon. To form the supported catalyst, the platinum-alloy nanoparticles may be dispersed in a solvent such as ethanol, for example, and catalyst support material may be added to the dispersion in powdered form to form a loading mixture. Thereupon, the loading mixture may be agitated, shaken, stirred, or sonicated for several minutes to several hours, after which the solvent may be removed by filtering and/or evaporation.

Still further embodiments are directed to a method for forming a supported catalyst comprising $Pt_3(Ni,Co)$ nanoparticles, defined as above, having (111)-oriented faces or facets. As noted above, the formula "$Pt_3(Ni,Co)$ nanoparticles" refers to nanoparticles having an average molar ratio (Pt:M) of platinum to other metals of approximately 3:1. However, it will be readily understood that deviations of the Pt:M molar ratio from exactly 3:1 within a given sample of nanoparticles may be attributable to the presence of some nonstoichiometric nanoparticles having an excess of either platinum, nickel, or cobalt. As such, the term "approximately 3:1" with respect to the Pt:M molar ratio shall be considered herein to mean "from about 2.7:1 to about 3.3:1," more particularly "from about 2.8:1 to about 3.2:1," and still more particularly "from about 2.9:1 to about 3.1:1." Furthermore, as used herein, the term "consists essentially of $Pt_3M$ nanoparticles" means that an elemental analysis of platinum-nickel-alloy nanoparticles, platinum-cobalt-alloy nanoparticles, or platinum-cobalt-nickel-alloy nanoparticles, synthesized according to the methods disclosed herein, determines that the molar ratio Pt:M in the nanoparticles is "approximately 3:1," as defined above.

The methods for forming such a supported catalyst may include forming a reaction mixture in a reaction vessel. The reaction mixture comprises (a) a platinum precursor; (b) a second precursor selected from the group consisting of a nickel precursor and a cobalt precursor; (c) a formamide reducing solvent; and (d) a capping agent, each of which is as described above in detail with regard to the method for forming platinum-alloy nanoparticles. Preferably, the reaction mixture may comprise (a) platinum(II) acetylacetonate; (b) a second precursor selected from the group consisting of nickel (II) acetylacetonate, cobalt(II) acetylacetonate, and cobalt (III) acetylacetonate; (c) N,N-dimethylformamide; and (d) a capping agent selected from the group consisting of cetyltrimethylammonium bromide, cetyltriethylammonium bromide, oleylamine, primary amines, pyridine, pyrrole, diethanolamine, triethanolamine, polyvinyl alcohol, adamantanecarboxylic acid, eicosanoic acid, oleic acid, tartaric acid, citric acid, heptanoic acid, polyethylene glycol, polyvinylpyrrolidone, tetrahydrothiophene, salts of any of the above-listed capping agents, and combinations of two or more of the capping agents.

In examples of methods to form the $Pt_3(Ni,Co)$ nanoparticles, the reaction mixture may comprise from 0.1% to 5% by weight platinum, preferably from 0.3% to 3% by weight platinum, more preferably from 0.5% to 2%, for example 0.6%, by weight platinum, based on the weight of the reaction mixture. The weight portion of platinum in the reaction mixture is derived from the weight of the platinum metal centers in the platinum(II) acetylacetonate, not the weight portion of the platinum(II) acetylacetonate complex itself. In addition, the reaction mixture may comprise from 0.01% to 2% by weight nickel or cobalt, preferably from 0.01% to 1% by weight nickel or cobalt, more preferably from 0.05% to 0.5%, for example 0.06%, by weight nickel or cobalt, based on the weight of the reaction mixture Likewise, the weight portion of nickel or cobalt in the reaction mixture is derived from the weight of the nickel or cobalt metal centers second precursor complex, not the weight portion of the second precursor complex itself.

In preferred methods to form the $Pt_3(Ni,Co)$ nanoparticles, the molar ratio of the platinum(II) acetylacetonate to the second precursor in the reaction mixture, which equals the molar ratio of platinum to nickel or cobalt in the reaction mixture, is about 3:1. For example, the molar ratio of the platinum(II) acetylacetonate to the second precursor in the reaction mixture may be from 2.5:1 to 3.5:1, from 2.7:1 to 3.3:1, or from 2.9:1 to 3.1:1.

The molar concentration of the platinum(II) acetylacetonate in the reaction mixture may be fixed to any practical amount, taking into consideration the solubility of the platinum(II) acetylacetonate in the solvent and the desired amount of nanoparticles to be synthesized. In example methods, the molar concentration of the platinum(II) acetylacetonate in the reaction mixture may range from about 10 mM (mM is "millimolar"=0.001 moles/L) to about 100 mM, preferably from about 20 mM to about 50 mM.

The reaction vessel then may be sealed, as described above. Preferably, both the forming of the reaction mixture and the sealing of the reaction vessel are carried out under ambient laboratory conditions The methods for forming a supported catalyst comprising $Pt_3(Ni,Co)$ nanoparticles having (111)-oriented faces or facets further comprise heating the reaction mixture sealed in said reaction vessel to a reaction temperature above 150° C. at a rate of at least 10° C./min and maintaining the temperature of the reaction vessel for at least 1 hour, preferably at least 2 hours, at least 4 hours, or at least 6 hours. During the maintaining of the reaction temperature, the $Pt_3(Ni,Co)$ nanoparticles having (111)-oriented faces or facets form within the reaction mixture. Thereupon, the reaction vessel is cooled, as described above.

The methods for forming a supported catalyst comprising $Pt_3(Ni,Co)$ nanoparticles may further include supporting the $Pt_3(Ni,Co)$ nanoparticles on a catalyst support material. The supporting of the nanoparticles may be accomplished by any means known in the art for supporting nanoparticles on a catalyst support. In preferred embodiments, the supporting may comprise dispersing the $Pt_3(Ni,Co)$ nanoparticles in a dispersing solvent to form a dispersion mixture. The dispersion solvent typically is a polar, water-miscible solvent such as an alcohol. For example, the dispersion solvent may be methanol or ethanol. Optionally, the $Pt_3(Ni,Co)$ nanoparticles may be agitated, such as by shaking, stirring, or sonicating, in the dispersion solvent before the catalyst support material is added. The agitation may occur in multiple cycles.

The supporting of the $Pt_3(Ni,Co)$ nanoparticles may further comprise adding a catalyst support material to the above-described dispersion mixture. The catalyst support material may be any high surface-area material amenable to supporting a platinum-based catalyst. Examples of catalyst support materials include various types of carbon or graphite. The dispersion mixture then may be agitated to encourage uniform and efficient loading of the $Pt_3(Ni,Co)$ nanoparticles onto the catalyst support material. After the catalyst support material is loaded, the supported catalyst formed in the dispersion mixture may be filtered by any practical means.

Many of the above embodiments are directed to platinum-alloy nanoparticle syntheses in sealed reaction vessels at temperatures above the boiling point of the formamide reducing solvent. However, it has been surprisingly found that formamide syntheses such as the DMF-based syntheses can be carried out with highly favorable results at temperatures below the boiling point of DMF (about 153° C.) in reaction vessels that may be sealed or unsealed, and also in reaction vessels that are stirred during the synthesis. Furthermore, the ORR activities from catalyst nanoparticles obtained with this lower temperature synthesis have been found to be significantly higher than that of any of the catalysts obtained using the higher temperature (e.g., above 150° C. or at about 200° C.) sealed-cell synthesis method.

According to some embodiments, N,N-dimethylformamide (DMF) may be used as the formamide reducing solvent in a relatively low-temperature reaction to generate platinum alloy nanocrystals. Specifically, precursor metal compounds may be dissolved in DMF and the solution may be heated to temperatures below 160° C., preferably below 150° C., such as from about 130° C. to 145° C., to generate platinum alloy nanoparticles that can serve as ORR electrocatalysts. The DMF synthesis is a simple and energy efficient method of producing very active platinum alloy ORR electrocatalysts.

In some embodiments, low-temperature methods for forming platinum-nickel-alloy nanoparticles may include heating, in a controlled manner, a solution of DMF containing appropriate metal precursors, to reaction temperatures of from about 120° C. to about 153° C., of from about 130° C. to about 150° C., or from about 130° C. to 145° C., or from about 130° C. to about 140° C., for an extended period such as 1 hour, 2 hours, 4 hours, 6 hours, 8 hours, 12 hours, 24 hours, or 48 hours. The DMF reacts with the precursors to produce well-faceted Pt alloy nanoparticles which may then be rinsed, collected, and supported on carbon. The nanoparticles may have various ratios of platinum to nickel. In preferred embodiments the Pt:Ni ratio in the reaction mixture is from about 1:1 to about 3:1, more preferably about 1:1. The Pt:Ni molar ratio of about 1:1 may be particularly advantageous, because the resulting alloys would have a lower mass percentage of platinum than a Pt:Ni=3:1 alloy, for example, and thereby be less expensive. It has also been found surprisingly that nanoparticles with a Pt:Ni molar ratio of about 1:1 may have superior characteristics in terms of catalyst mass activity, regardless of considerations such as (111)-oriented facets orientation that may be important characteristics of nanoparticles with a Pt:Ni molar ratio of about 3:1 ($Pt_3$(Ni,Co), for example) to produce superior mass activity.

In some embodiments, the reaction vessel may be stirred by any practical method such as by magnetic stir bar or sonication, for example, while the reaction temperature is maintained. In other embodiments, the reaction vessel may be left quiescent (unstirred) while at the reaction temperature.

In non-limiting preferred embodiments of the low-temperature methods, reaction temperatures may be below the boiling point of the formamide solvent (e.g., DMF). The PtNi nanoparticles formed at low temperatures such as below 150° C. or below 140° C., or from about 130° C. to 145° C. may have substantially higher activity than $Pt_3$Ni or PtNi nanoparticles formed at high temperatures such as from 150° C. to 200° C. or higher than 200° C. For example, a low-temperature (140° C.±3° C.) DMF synthesis may result in a PtNi ORR catalyst having a platinum mass activity greater than 0.70 $mA/\mu g_{Pt}$ at 0.90 V (about 0.79 $mA/\mu g_{Pt}$; see Example 19 below), compared to a PtNi catalyst prepared at 200° C. and having an activity of about 0.68 $mA/\mu g_{Pt}$ (see Example 15 below) and to a $Pt_3$Ni catalyst prepared at 200° C. and having an activity of about 0.19 $mA/\mu g_{Pt}$ (see Example 4 below).

In some embodiments of the low-temperature methods, a synthesis may include heating a DMF solution of 30 mM platinum acetylacetonate and 30 mM nickel acetylacetonate in a stirred cell at 140° C.±3° C. for about 1 hour to about 6 hours. The resulting Pt—Ni alloy nanocrystals may be collected immediately by centrifugation or supported on carbon by mixing with a carbon suspension. Washing of the catalyst material, either supported or unsupported, is accomplished by dispersing and stirring or sonicating the solids in an organic solvent such as ethanol, followed by centrifugation or filtering. This may be repeated several times.

In illustrative embodiments, methods for forming platinum-nickel-alloy nanoparticles using the low-temperature (i.e., below the boiling point of the formamide reducing solvent) process may include forming a reaction mixture in a reaction vessel; heating the reaction mixture sealed in the reaction vessel to a reaction temperature; maintaining the temperature of the reaction vessel for a period of time; cooling the reaction vessel; and removing platinum-alloy nanoparticles from the reaction vessel. The reaction mixture may comprise a platinum precursor; a nickel precursor; and a formamide reducing solvent. In the reaction mixture, the platinum precursor may be selected from metallo-organic compounds or platinum salts such as, for example, platinum (II) acetylacetonate, diammineplatinum(IV) hexachloride, diammineplatinum(II) nitrite, dimethyl(1,5-cyclooctadiene)platinum(II), potassium tetrachloroplatinate(II), dihydrogen hexachloroplatinate(IV) hydrate, tetraammineplatinum(II) nitrate, and cis-dichlorobis(triphenylphosphine)platinum(II). The nickel precursor may be selected from metallo-organic compounds or nickel salts such as, for example, nickel(II) acetylacetonate, nickel(II) acetate, nickel(II) 2-ethylhexanoate, nickel(II) nitrate, and hexaamminenickel(II) iodide. The formamide reducing solvent may be selected, for example, from substituted formamides having the formula $R^1R^2N$—C(=O)H, where $R^1$ and $R^2$ are independently selected from hydrogen and a $C_1$-$C_6$ hydrocarbyl, as defined herein. It may be preferable that the formamide reducing solvent be selected from substituted formamides having the formula $R^1R^2N$—C(=O)H, where $R^1$ and $R^2$ are independently selected from hydrogen and a $C_1$-$C_6$ hydrocarbyl, such that $R^1$ and $R^2$ are not both hydrogen. Most preferably, the formamide reducing solvent is N,N-dimethylformamide.

For the low-temperature synthesis, the molar ratio of platinum to nickel in the reaction mixture may be from about 0.5:1 to about 4:1, preferably from about 0.5:1 to about 3:1, more preferably from about 0.5:1 to about 2:1, still more preferably from about 0.5:1 to about 1.5:1, most preferably about 1:1, such as from 0.9:1 to 1.1:1.

In some embodiments of the low-temperature synthesis, the reaction mixture may further comprise a cobalt precursor such as cobalt(II) acetylacetonate, cobalt(III) acetylacetonate, cobalt(II) acetate, cobalt(II) 2-ethylhexanoate, cobalt (II) nitrate, cobalt(II) sulfate, hexaamminecobalt(III) iodide, and cobalt(II) stearate. Of these cobalt precursors, cobalt(II) acetylacetonate and cobalt(III) acetylacetonate are preferred. In such embodiments, the molar ratio of platinum to the sum of nickel and cobalt (Pt/(Ni+Co)) may be from about 0.5:1 to about 4:1, preferably from about 0.5:1 to about 3:1, more preferably from about 0.5:1 to about 2:1, still more preferably from about 0.5:1 to about 1.5:1, most preferably about 1:1, such as from 0.9:1 to 1.1:1. Thus, the platinum-nickel-alloy nanoparticles may include platinum-nickel-cobalt-alloy nanoparticles such as $PtNi_xCo_{1-x}$ (0<x≤1), for example $PtNi_{0.9}CO_{0.1}$, $PtNi_{0.5}Co_{0.5}$, or $PtNi_{0.1}Co_{0.9}$, for example.

For the low-temperature synthesis, the reaction vessel may be any suitable vessel that can be sealed and that, once sealed, can withstand internal pressures created by heating the reaction mixture inside the reaction vessel to a reaction temperature of up to about 150° C. Preferably, the reaction vessel is made from a material chemically inert to all components of the reaction mixture. Examples of a suitable reaction vessel include a PTFE or Teflon® vessel that optionally is sealed or sealable. Specific, non-limiting examples of a suitable reaction vessel include acid digestion vessels ('bombs'), available from Parr Instrument Company, which comprise a capped PTFE canister that fits snugly in a stainless-steel outer shell that is sealable with a threaded end cap. Other suitable vessels include glass containers such as glass vials. In some embodiments, the reaction vessel may be sealed when the reaction temperature is maintained. In other embodiments the reaction vessel need not be sealed when the reaction temperature is maintained.

For the low-temperature synthesis, the heating of the reaction mixture may follow a fast or a slow temperature profile, but preferably the heating from room temperature to reaction temperature occurs as quickly as practical. For example, the heating of the reaction mixture may be accomplished at a rate as low as 0.1° C./min, as quick as 50° C./min, or any rate between 0.1° C./min and 50° C./min. Preferably, the reaction mixture is heated at a rate of at least 10° C./min, more preferably at least 15° C./min, still more preferably from about 15° C./min to about 30° C./min, from about 15° C./min to about 25° C./min, or from about 25° C./min to about 40° C./min.

EXAMPLES

The following Examples are offered by way of illustration only, and one skilled in the art should recognize the Examples are not meant to be limiting.

General Synthetic Method

In Examples 1-16 and Comparative Examples 1 and 2, platinum-alloy nanoparticles were synthesized and supported on a catalyst support material according to the following General Synthetic Method, to which variations are described in the context of specific Examples below.

A reaction mixture for platinum-nickel-alloy nanoparticles is formed by sequentially adding to a Teflon reaction vessel 0.1416 g of platinum(II) acetylacetonate, 0.0308 g of nickel (II) acetylacetonate, and 12 mL (11.8 g) of N,N-dimethylformamide. In this reaction mixture, the molar concentrations of platinum and nickel are 30 mM and 10 mM, respectively (Pt/Ni molar ratio of 3:1). Platinum-cobalt-alloy nanoparticles are made by replacing the nickel(II) acetylacetonate in the above reaction mixture with a molar-equivalent amount of either cobalt(II) acetylacetonate or cobalt(III) acetylacetonate. In select Examples, the amounts of the ingredients are altered to investigate the effect of initial metal stoichiometry on the resulting nanoparticles. In further Examples, an additional capping agent is added to the reaction mixture.

The PTFE reaction vessel is a cylindrical 4749 acid digestion vessel (Pan Instrument Company) with an internal volume of 23 mL. The PTFE reaction vessel includes a PTFE top and fits snugly into a cylindrical stainless steel cell, which can be sealed with a threaded end cap. The reaction vessel then is heated to a reaction temperature of 200° C. according to a predetermined ramp schedule and is allowed to remain at the reaction temperature for a predetermined dwell time.

At the end of the predetermined dwell time for the reaction, the reaction vessel is allowed to cool and is opened. Any clear liquid in the reaction vessel is poured off and discarded. The nanoparticles suspended in the remaining reaction mixture then are dispersed in ethanol, and the nanoparticle/ethanol mixture is sonicated and centrifuged three times. A sufficient amount (typically 0.15 g) of high surface-area carbon catalyst support such as Vulcan XC72R or Ketjenblack EC-300J to obtain a catalyst loading of about 30% by weight, based on the weight of the metal catalyst nanoparticles, is dispersed in a separate ethanol solution. The ethanol/nanoparticle dispersion then is added to the support/ethanol dispersion and sonicated to allow the nanoparticles to load onto the catalyst support material. The loaded catalyst support is filtered, washed repeatedly with ethanol and water, and allowed to dry under vacuum overnight.

Characterization Methods

Supported catalysts are analyzed by x-ray diffraction (XRD) to determine average lattice parameters. XRD data are collected on a Siemens D5000 diffractometer in a parallel-beam configuration using copper $K_\alpha$ radiation. Data are collected by sweeping 2θ from 10° to 100° at a fixed incidence angle of 4° using a 0.04° step size. Lattice parameters are calculated from the diffraction peak angle using Bragg's Law.

Scanning transmission electron microscopy (STEM) images are obtained with a Cs-corrected JEOL 2100F TEM/STEM operated at 200 kV. The Cs-corrected STEM is equipped with a Schottky field emission gun (FEG), a CEOS GmbH hexapole aberration corrector, and a high-angle annular dark-field (HAADF) detector. The catalyst samples are first immersed in methanol or ethanol and subsequently are dispersed ultrasonically for 5 min. A drop of the solution is placed on a 3-mm diameter lacey-carbon grid and is dried in air for STEM analysis.

Particle sizes are determined by one or both of XRD and STEM. The nanoparticles are qualitatively and semi-quantitatively analyzed by STEM to determine shape and faceting, whereby the apparent geometry of nanocrystalline faces are used to infer the presence or absence of surfaces having (111)-orientations.

Catalyst activities for the oxygen-reduction reaction (ORR) are measured at room temperature with a rotating disk electrode (RDE) method similar to the method reported in Schmidt et al., *J. Electrochem. Soc.*, vol. 145(7), pp. 2354-2358 (1998). Catalyst inks are made by preparing a mixture containing from 0.5 mg/mL to 1.0 mg/mL catalyst in a solution that contains from 0 to 20% (v/v) 2-propanol in water (MΩ pure, Millipore) and a small amount of 5 wt. % Nafion® solution (Alfa Aesar) to act as a binder. The weight ratio of Nafion®-to-carbon is about 0.1. After sonicating at room temperature from 5 minutes to 10 minutes, the dispersed inks are deposited via a micropipette onto the 5-mm diameter glassy-carbon disk of an RDE in a single 20-μL drop. The deposited inks are allowed to dry under ambient conditions in air to form thin catalyst films that can be tested by RDE methods.

Before the cyclic voltammetry (CV) measurements are made, the thin film electrodes are immersed with 0.1 M $HClO_4$ (GFS Chemicals) at open circuit in a three-electrode cell, while sparging with argon for at least 20 minutes. A platinum gauze serves as the counter electrode, and a reversible hydrogen electrode (RHE) is utilized as the reference electrode. Cyclic voltammograms are collected at 20 mV/s to allow for the determination of the hydrogen adsorption (HAD) in the underpotential deposition region (1 mV to 400 mV) from which the exposed Pt surface area can be calculated, assuming 210 $\mu A/cm_{Pt}^2$. Following the HAD area determination, the solution is oxygen-saturated, and $O_2$ is continuously sparged during the RDE measurements of ORR activity. The RDE measurements are performed at room temperature at rotation rates of 100 rpm, 400 rpm, 900 rpm, and 1600 rpm. The films are initially held at 0.150 V for 60 seconds, then swept to 1.1 V at 5 mV/s. In accordance with accepted methods, the kinetic current density ($i_k$) is estimated by measuring the geometric current density (i) at 0.9 V and correcting for diffusion through the hydrodynamic boundary layer ($i_{lim}$): $1/i_k = 1/I - 1/t_{lim}$.

Reaction Mixtures without Capping Agent

Example 1

Platinum-nickel alloy nanoparticles were prepared according to the General Synthetic Method above, without a capping agent. The reaction vessel was heated following a step-wise ramp, whereby the temperature of the reaction vessel was heated quickly to 80° C., held for 1.5 hours, heated quickly to 140° C., held for 1 hour, heated quickly to 200° C. The reaction temperature of 200° C. was maintained for 24 hours. The resulting nanoparticles were mostly cubic nanoparticles having particle sizes of about 10 nm, as determined by TEM. Elemental analysis of the nanoparticles determined an overall Pt:Ni molar ratio of 3.2:1.

Example 2

Platinum-nickel alloy nanoparticles were prepared according to the General Synthetic Method above, without a capping agent, except that one-half the molar amounts of platinum(II) acetylacetonate and nickel(II) acetylacetonate were added to the initial reaction mixture while retaining a Pt/Ni molar ratio of 3.0. The reaction vessel was heated over 2 hours to a reaction temperature of 200° C. (about 0.7° C./min), and this reaction temperature was maintained for 4 hours. The resulting nanoparticles had a distribution of sizes from about 3.5 nm to about 13 nm and a shape distribution including many octahedral nanoparticles and cuboctahedral nanoparticles. Elemental analysis of the nanoparticles determined an overall Pt:Ni molar ratio of 4.1:1.

Example 3

Platinum-nickel alloy nanoparticles were prepared according to the General Synthetic Method above, without a capping agent, except that double the molar amounts of platinum(II) acetylacetonate and nickel(II) acetylacetonate were added to the initial reaction mixture while retaining a Pt/Ni molar ratio of 3.0. The reaction vessel was heated following a step-wise ramp, whereby the temperature of the reaction vessel was heated quickly to 80° C., held for 1.5 hours, heated quickly to 140° C., held for 1 hour, heated quickly to 200° C. The reaction temperature of 200° C. was maintained for 24 hours. The resulting nanoparticles had a distribution of sizes, with most nanoparticles ranging from about 7 nm to about 12 nm, and a shape distribution including many octahedral nanoparticles and cuboctahedral nanoparticles. The lattice parameter of the nanoparticles was determined by x-ray diffraction to be 3.8423 Å. Elemental analysis of the nanoparticles determined an overall Pt:Ni molar ratio of 3.2:1.

Example 4

Platinum-nickel alloy nanoparticles were prepared according to the General Synthetic Method above, without a capping agent. The reaction vessel was heated quickly (at about 20° C./min) to 200° C. The reaction temperature of 200° C. was maintained for 24 hours. The c-axis lattice parameter of the nanoparticles was determined by x-ray diffraction to be 3.8425 Å. Elemental analysis of the nanoparticles determined an overall Pt:Ni molar ratio of 3.1:1.

Example 5

Platinum-nickel alloy nanoparticles were prepared according to the General Synthetic Method above, without a capping agent. The reaction vessel was heated over 30 minutes (at about 6° C./min) to 200° C. The reaction temperature of 200° C. was maintained for 2 hours. The c-axis lattice parameter of the nanoparticles was determined by x-ray diffraction to be 3.8371 Å. Elemental analysis of the nanoparticles determined an overall Pt:Ni molar ratio of 2.9:1.

Example 6

Platinum-nickel alloy nanoparticles were prepared according to the General Synthetic Method above, without a capping agent. The reaction vessel was heated quickly (at about 20° C./min) to 200° C. The reaction temperature of 200° C. was maintained for 4 hours. As determined by TEM, the resulting nanoparticles had a distribution of sizes from about 10 nm to about 12 nm and a shape distribution including mostly cuboctahedral nanoparticles and some cubic nanoparticles. The c-axis lattice parameter of the nanoparticles was determined by x-ray diffraction to be 3.8387 Å. Elemental analysis of the nanoparticles determined an overall Pt:Ni molar ratio of 2.8:1.

Example 7

Platinum-nickel alloy nanoparticles were prepared according to the General Synthetic Method above, without a capping agent. The reaction vessel was heated over the course of 6 hours (at about 0.5° C./min) to 200° C. The reaction temperature of 200° C. was maintained for 4 hours. As determined by TEM, the resulting nanoparticles had a narrow distribution of sizes, with an average particle size of about 11.4 nm. Most of the nanoparticles were cuboctahedral nanoparticles, although some were cubic nanoparticles. Many of the nanoparticles were agglomerated. The lattice parameter of the nanoparticles was determined by x-ray diffraction to be 3.8366 Å. Elemental analysis of the nanoparticles determined an overall Pt:Ni molar ratio of 3.2:1.

Example 8

Platinum-cobalt alloy nanoparticles were prepared according to the General Synthetic Method above using cobalt(II) acetylacetonate as the cobalt precursor, without a capping agent. The reaction vessel was heated quickly (at about 20° C./min) to 200° C. The reaction temperature of 200° C. was maintained for 24 hours. The nanoparticles were well dispersed and exhibited significant numbers of (111) faces or facets in TEM analysis. The average particle size was about 12.1 nm, with an observed particle size range of about 5.4 nm to about 16.1 nm. Elemental analysis of the nanoparticles determined an overall Pt:Co of about 3.25, consistent with a nominal composition of $Pt_3Co$.

Example 9

Platinum-cobalt alloy nanoparticles were prepared according to the General Synthetic Method above using cobalt(III) acetylacetonate as the cobalt precursor, without a capping agent. The reaction vessel was heated quickly (at about 20° C./min) to 200° C. The reaction temperature of 200° C. was maintained for 24 hours. The nanoparticles were slightly aggregated but exhibited significant numbers of (111) faces or facets, evident from a prevalence of cuboctahedral nanoparticles in TEM analysis. The average particle size was about 10 nm, with an observed particle size range of about 4.8 nm to about 13 nm. Some catalyst particles appeared to have a core-shell structure, wherein the core was substantially a platinum-cobalt alloy and the shell surrounding the core consisted essentially of platinum. Elemental analysis of the nanoparticles determined an overall Pt:Co of about 3.22, consistent with a nominal composition of $Pt_3Co$.

Reaction Mixtures with Capping Agents

Example 10

Platinum-nickel alloy nanoparticles were prepared according to the General Synthetic Method above, except that, instead of adding 12 mL of DMF to the initial reaction mixture, 11 mL of DMF and 1 mL of oleylamine were added. The reaction vessel was heated quickly (at about 20° C./min) to 200° C. The reaction temperature of 200° C. was maintained for 22 hours. Before being loaded onto the catalyst support material, the nanoparticles were washed in a mixture of ethanol, methanol, and methylethyl ketone (2-butanone). Many of the nanoparticles were agglomerated and either not well faceted or coated, likely with organic residue. The c-axis lattice parameter of the $Pt_3Ni$ nanoparticles was determined by x-ray diffraction to be 3.8534 Å. Elemental analysis of the nanoparticles determined an overall Pt:Ni molar ratio of 3.3:1.

Example 11

The platinum-nickel alloy nanoparticles from Example 10 were oxidatively annealed in air for 4 hours at 185° C. to remove organic adsorbates from the surfaces of the nanoparticles. The annealing resulted in substantially increased electrocatalytic activity of a supported catalyst formed from the nanoparticles. Elemental analysis of the nanoparticles determined an overall Pt:Ni molar ratio of 3.2:1.

Example 12

Platinum-nickel alloy nanoparticles were prepared according to the General Synthetic Method above, in which 0.3494 g of cetyltrimethylammonium bromide (hexadecyl-trimethylammonium bromide; CTAB) was added to the initial reaction mixture. The reaction vessel was heated quickly (at about 20° C/min) to 200° C. The reaction temperature of 200° C was maintained for 24 hours. The resulting nanoparticles had a distribution of sizes from about 8 nm to about 24 nm. Before being loaded onto the catalyst support material, the nanoparticles were washed in a mixture of ethanol and methanol. Some platinum nanoparticles with c-axis lattice parameter of 3.699 Å were identified among the $Pt_3Ni$ nanoparticles by x-ray diffraction. The c-axis lattice parameter of the $Pt_3Ni$ nanoparticles was determined by x-ray diffraction to be 3.8534 Å. Elemental analysis of the nanoparticles determined an overall Pt:Ni molar ratio of 3.3:1.

Synthesis of Platinum-Nickel Nanoparticles with Varying Pt/Ni Reactant Molar Ratios

Example 13

Platinum-nickel nanoparticles were prepared according to the General Synthetic Method above, without a capping agent, except the reaction mixture was prepared to contain 30 mM platinum precursor and 15 mM nickel precursor (Pt/Ni molar ratio of 2:1). The reaction temperature of 200° C. was maintained for 24 hours. The nanoparticles contained two distinct phases, as determined by Rietveld analysis. The first phase contained about 85 wt. % platinum and 15 wt. % nickel and accounted for about 61 wt. % of the recovered nanoparticles, with average crystallite sizes of about 3.1 nm. The second phase contained about 68 wt. % platinum and 32 wt. % nickel and accounted for about 39 wt. % of the recovered nanoparticles, with average crystallite sizes of about 5.9 nm.

Example 14

Platinum-nickel nanoparticles were prepared according to the General Synthetic Method above, without a capping agent, except the reaction mixture was prepared to contain 30 mM platinum precursor and 20 mM nickel precursor (Pt/Ni molar ratio of 1.5:1). The reaction temperature of 200° C. was maintained for 24 hours. The nanoparticles contained two distinct phases, as determined by Rietveld analysis. The first phase contained about 83 wt. % platinum and 17 wt. % nickel and accounted for about 32 wt. % of the recovered nanoparticles, with average crystallite sizes of about 4.0 nm. The second phase contained about 65 wt. % platinum and 35 wt. % nickel and accounted for about 68 wt. % of the recovered nanoparticles, with average crystallite sizes of about 7.4 nm.

Example 15

Platinum-nickel nanoparticles were prepared according to the General Synthetic Method above, without a capping agent, except the reaction mixture was prepared to contain 30 mM platinum precursor and 30 mM nickel precursor (Pt/Ni molar ratio of 1:1). The reaction temperature of 200° C. was maintained for 24 hours. The nanoparticles contained two distinct phases, as determined by Rietveld analysis. The first phase contained about 76 wt. % platinum and 24 wt. % nickel and accounted for about 40 wt. % of the recovered nanoparticles, with average crystallite sizes of about 6.7 nm. The second phase contained about 57 wt. % platinum and 43 wt. % nickel and accounted for about 60 wt. % of the recovered nanoparticles, with average crystallite sizes of about 6.7 nm.

Example 16

Platinum-nickel nanoparticles were prepared according to the General Synthetic Method above, without a capping agent, except the reaction mixture was prepared with 15 mM platinum precursor and 30 mM nickel precursor (Pt/Ni molar ratio of 0.5:1). The reaction temperature of 200° C. was maintained for 24 hours. The nanoparticles contained two distinct phases, as determined by Rietveld analysis. The first phase contained about 67 wt. % platinum and 33 wt. % nickel and accounted for about 37 wt % of the recovered nanoparticles, with average crystallite sizes of about 3.8 nm. The second phase contained about 53 wt. % platinum and 47 wt. % nickel and accounted for about 63 wt. % of the recovered nanoparticles, with average crystallite sizes of about 6.1 nm.

Low-Temperature Synthesis of Platinum-Nickel Nanoparticles

In Examples 17-19, platinum-nickel nanoparticles are formed at lower temperatures than in the above Examples, particularly below the boiling point of the formamide reducing solvent (DMF). Reaction mixtures for the low-temperature syntheses described in Examples 17-19 are formed by sequentially adding to a reaction vessel 0.1416 g of platinum (II) acetylacetonate, 0.0924 g of nickel(II) acetylacetonate, and 12 mL (11.8 g) of N,N-dimethylformamide. In this reaction mixture, the molar concentrations of platinum and nickel are 30 mM and 30 mM (Pt/Ni molar ratio of 1:1), respectively.

The reaction vessel then is heated to a reaction temperature of at or below 140° C. in an oil bath according to a predetermined ramp schedule. The reaction vessel is allowed to remain at the reaction temperature for a predetermined dwell time. Removal, suspension, and supporting of the nanoparticles, and post-treating the suspended catalyst are carried out as described above in the General Synthetic Method.

Example 17

Platinum-nickel nanoparticles were prepared using the reaction mixture with a Pt/Ni molar ratio of 1:1. The reaction vessel was a sealed PTFE cell. The reaction temperature was from 130° C. to 134° C., and the dwell time was 24 hours. The nanoparticles contained two distinct phases, as determined by Rietveld analysis. The first phase contained about 73 wt. % to 85 wt. % platinum and about 15 wt. % to 27 wt.% nickel. The second phase contained about 57 wt. % to 68 wt. % platinum and about 32 wt. % to about 43 wt. % nickel. Elemental analysis of the nanoparticles determined an overall Pt:Ni molar ratio of 1.3:1.

Example 18

Platinum-nickel nanoparticles were prepared using the reaction mixture with a Pt/Ni molar ratio of 1:1. The reaction vessel was a sealed glass vial. The reaction temperature was from 137° C. to 143° C., and the dwell time was 6 hours. The nanoparticles contained two distinct phases, as determined by Rietveld analysis. The first phase contained about 73 wt. % to 85 wt. % platinum and about 15 wt. % to 27 wt. % nickel. The second phase contained about 57 wt. % to 68 wt. % platinum and about 32 wt. % to about 43 wt. % nickel. Elemental analysis of the nanoparticles determined an overall Pt:Ni molar ratio of 1.9:1.

Example 19

Platinum-nickel nanoparticles were prepared using the reaction mixture with a Pt/Ni molar ratio of 1:1. The reaction vessel was a sealed glass vial, which was stirred during the heating. The reaction temperature was from 137° C. to 143° C., and the dwell time was 6 hours. The nanoparticles contained two distinct phases, as determined by Rietveld analysis. The first phase contained about 79 wt. % platinum and about 21 wt. % nickel, accounting for about 31 wt. % of all the nanoparticles. The second phase contained about 59 wt. % platinum and about 41 wt. % nickel, accounting for about 69 wt. % of all the nanoparticles. Elemental analysis of the nanoparticles determined an overall Pt:Ni molar ratio of 1.2:1. Platinum mass activity of the nanoparticles was notably high.

Example 20

Platinum-nickel-cobalt nanoparticles were prepared using a reaction mixture containing 30 mM of platinum(II) acetylacetonate, 27 mM of nickel(II) acetylacetonate, 3.0 mM of cobalt(II) acetylacetonate, and 12 mL (11.8 g) of N,N-dimethylformamide with a Pt/Ni molar ratio of 1:1. The reaction vessel was a sealed glass vial, which was stirred during the heating. The reaction temperature was about 148° C., and the dwell time was 6 hours. Platinum mass activity of the $PtNi_{0.9}Ni_{0.1}$ nanoparticles was notably high.

Comparative Example 1

A reaction was conducted according to the General Synthetic Method above, in which the initial reaction mixture consisted of 0.1415 g of platinum(II) acetylacetonate, 0.0309 g of nickel(II) acetylacetonate, 6 mL (5.7 g) of N,N-dimethylformamide, 5.4 mL/g oleylamine, 0.6 mL/g oleic acid, and 0.1995 g tungsten hexacarbonyl ($W(CO)_6$). The reaction vessel was heated over the course of 30 minutes (at about 5-6° C./min) to 200° C. The reaction temperature of 200° C. was maintained for 6 hours. Nanoparticles were formed that were highly agglomerated and had a variety of shapes including spherical nanoparticles, ellipsoidal nanoparticles, and some cuboctahedral nanoparticles. Elemental analysis of the nanoparticles determined a Pt:Ni molar ratio of about 6.8:1, consistent with a low number of $Pt_3Ni$ nanoparticles having been formed. Without intent to be bound by theory, it is believed that the oleylamine/oleic acid capping agents impede the DMF reduction of the nickel precursor and do not promote the growth of well-faceted nanocrystals.

Comparative Example 2

As a basis for comparison with the nanoparticles prepared and supported according to the above Examples, a commercial catalyst supplied by TKK (Tanaka Kikinzoku Kogyo K.K.) and comprising platinum nanoparticles supported on high surface area carbon was used.
Electrocatalytic Activity Characterizations The platinum-nickel-alloy nanoparticles from selected Examples above were supported on carbon according to the General Synthetic Method, and their electrocatalytic activities were characterized by RDE measurements. The electrocatalytic activity parameters for each characterized Example are summarized in TABLE 1.

TABLE 1

Electrocatalytic activity of supported catalysts comprising platinum-nickel or platinum-cobalt nanoparticles prepared according to selected Examples above

| Example | Reactant Molar Ratio Pt/Ni/Co | Platinum Electrochemical Surface Area HAD in $m^2/g_{Pt}$ | Platinum Mass Activity $mA/\mu g_{Pt}$ at 0.90 V | Platinum Specific Activity $mA/cm_{Pt}^2$ at 0.90 V |
|---|---|---|---|---|
| Example 1 | 3.0/1/0 | 21 | 0.08 | 0.374 |
| Example 2 | 3.0/1/0 | 20 | 0.08 | 0.444 |
| Example 3 | 3.0/1/0 | 21 | 0.14 | 0.652 |
| Example 4 | 3.0/1/0 | 11 | 0.19 | 1.696 |
| Example 5 | 3.0/1/0 | 17 | 0.07 | 0.416 |
| Example 8 | 3.0/0/1 | 21 | 0.13 | 0.599 |
| Example 9 | 3.0/0/1 | 22 | 0.17 | 0.792 |
| Example 10 | 3.0/1/0 | 16 | 0.21 | 1.196 |
| Example 11 | 3.0/1/0 | 17 | 0.28 | 1.730 |
| Example 12 | 3.0/1/0 | 18 | 0.19 | 1.045 |
| Example 13 | 2.0/1/0 | 20 | 0.20 | 1.004 |
| Example 14 | 0.5/1/0 | 24 | 0.59 | 2.455 |
| Example 15 | 1.0/1/0 | 23 | 0.68 | 2.977 |
| Example 16 | 0.5/1/0 | 34 | 0.49 | 1.426 |
| Example 17 | 1.0/1/0 | 20 | 0.49 | 2.497 |
| Example 18 | 1.0/1/0 | 26 | 0.47 | 2.121 |
| Example 19 | 1.0/1/0 | 37 | 0.79 | 2.156 |
| Example 20 | 1.0/0.9/0.1 | 25 | 0.74 | 2.900 |
| Comparative Example 1 | — | — | — | — |
| Comparative Example 2 | Pt only | 85 | 0.09 | 0.20 |

According to the electrocatalytic-activity data, each of the exemplary supported catalysts with $Pt_3Ni$ nanoparticles (nominal compositions, using reaction mixtures with Pt/Ni molar ratios of 3:1) exhibited platinum mass activities significantly greater than the control sample of platinum nanoparticles detailed through Comparative Example 2. All Examples of $Pt_3Ni$ nanoparticles exhibited also platinum specific activities significantly greater than that of the platinum control. The highest platinum mass activity of 0.79 $mA/\mu g_{Pt}$ at 0.90 V was achieved from the low-temperature synthesis according to Example 19, from which a mixture of two phases of platinum-nickel-alloy nanoparticles (characterized as 31 wt. % $Pt_{79}Ni_{21}$ and 69 wt. % $Pt_{59}Ni_{41}$) were formed using a reaction mixture with a Pt/Ni molar ratio of 1:1. The second-highest mass activity of 0.74 $mA/\mu g_{Pt}$ at 0.90 V was achieved from the $PtNi_{0.9}Co_{0.1}$ sample of Example 20.

It is noted that terms such as "preferably," "commonly," and "typically" are not utilized herein to limit the scope of the claims or to imply that certain features are critical, essential, or even important to the structure or function of the claimed subject matter. Rather, these terms are merely intended to highlight alternative or additional features that may or may not be utilized in a particular embodiment.

For the purposes of describing and defining the certain embodiments it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

What is claimed is:

1. A method of synthesizing platinum-nickel-alloy nanoparticles, the method comprising:
   forming a reaction mixture in a reaction vessel, wherein the reaction mixture does not include a capping agent, the reaction mixture comprising:
   (a) a platinum precursor;
   (b) a nickel precursor; and
   (c) a formamide reducing solvent;
   heating the reaction mixture in the reaction vessel to a reaction temperature of at least 120° C.;
   maintaining the temperature of the reaction vessel for at least 1 hour;
   cooling the reaction vessel; and
   removing platinum-nickel alloy nanoparticles from the reaction vessel.

2. The method of claim 1, wherein the reaction temperature is from 120° C. to the boiling point of the formamide reducing solvent.

3. The method of claim 2, wherein the molar ratio of platinum to nickel in the reaction mixture is from about 0.5:1 to about 3:1.

4. The method of claim 2, wherein the molar ratio of platinum to nickel in the reaction mixture is about 1:1.

5. The method of claim 4, wherein the reaction temperature is from about 130° C. to 150° C.

6. The method of claim 1, further comprising stirring the reaction mixture in the reaction vessel while the reaction mixture is heated and while the reaction temperature is maintained.

7. The method of claim 1, further comprising sealing the reaction vessel before heating the reaction mixture.

8. The method of claim 1, wherein the reaction vessel is left unsealed during the heating of the reaction mixture and the maintaining of the temperature of the vessel.

9. The method of claim 1, wherein the temperature is maintained for at least 6 hours.

10. The method of claim 1, wherein the formamide reducing solvent is selected from alkyl-substituted formamides having the formula $R^1R^2N-C(=O)H$, where $R^1$ and $R^2$ are independently selected from hydrogen and a $C_1$-$C_6$ hydrocarbyl.

11. The method of claim 1, wherein the formamide reducing solvent is selected from the group consisting of formamide, N-methylformamide, N-ethylformamide, N,N-dimethylformamide and N,N-diethylformamide.

12. The method of claim 1, wherein the formamide reducing solvent is N,N-dimethylformamide.

13. The method of claim 1, wherein the platinum precursor is platinum(II) acetylacetonate and the nickel precursor is nickel(II) acetylacetonate.

14. The method of claim 1, wherein the reaction mixture further comprises a cobalt precursor, and the molar ratio of platinum to the sum of nickel and cobalt in the reaction mixture is about 1:1.

15. The method of claim 14, wherein the cobalt precursor is selected from the group consisting of cobalt(II) acetylacetonate, cobalt(III) acetylacetonate, and mixtures thereof.

16. A method of synthesizing platinum-nickel-alloy nanoparticles, the method comprising:
   forming a reaction mixture in a reaction vessel, wherein the reaction mixture does not include a capping agent, the reaction mixture comprising:
   (a) platinum(II) acetylacetonate;
   (b) nickel(II) acetylacetonate; and
   (c) N,N-dimethylformamide,
   wherein the molar ratio of platinum to nickel in the reaction mixture is about 1:1;
   heating the reaction mixture in the reaction vessel to a reaction temperature of from about 130° C. to about 145° C.;
   maintaining the temperature of the reaction vessel for from about 6 hours to about 24 hours;
   stirring the reaction vessel while maintaining the temperature;
   cooling the reaction vessel; and
   removing platinum-nickel-alloy nanoparticles from the reaction vessel.

17. The method of claim 16, wherein the reaction vessel is a glass vial or a polytetrafluoroethylene vessel.

18. The method of claim 17, further comprising sealing the reaction vessel before heating the reaction mixture.

19. The method of claim 16, wherein the platinum-nickel alloy nanoparticles exhibit a platinum mass activity greater than 0.70 mA/$\mu_{Pt}$ at 0.90 V.

20. A supported catalyst comprising:
   platinum-nickel-alloy nanoparticles prepared according to the method of claim 2, wherein:
   the platinum-nickel-alloy nanoparticles comprise a molar ratio of platinum to nickel of about 3:1,
   the platinum-nickel-alloy nanoparticles comprise cuboctahedral nanoparticles, and
   the platinum-nickel-alloy nanoparticles have a mean particle size of from about 3 nm to about 15 nm; and
   a catalyst support having the platinum-nickel-alloy nanoparticles dispersed on outer surfaces of the catalyst support.

* * * * *